United States Patent
Sakai et al.

(10) Patent No.: US 12,469,303 B2
(45) Date of Patent: Nov. 11, 2025

(54) EXTERNAL RECOGNITION DEVICE

(71) Applicant: Faurecia Clarion Electronics Co., Ltd., Saitama (JP)

(72) Inventors: Takahiro Sakai, Tokyo (JP); Morihiko Sakano, Tokyo (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 425 days.

(21) Appl. No.: 17/591,279

(22) Filed: Feb. 2, 2022

(65) Prior Publication Data
US 2022/0254164 A1    Aug. 11, 2022

(30) Foreign Application Priority Data
Feb. 8, 2021    (JP) .................................. 2021-018600

(51) Int. Cl.
*G06V 20/58*    (2022.01)
*G06T 7/20*    (2017.01)
(Continued)

(52) U.S. Cl.
CPC ............... *G06V 20/58* (2022.01); *G06T 7/20* (2013.01); *G06T 7/70* (2017.01); *G06V 10/25* (2022.01)

(58) Field of Classification Search
CPC .......... G06V 20/58; G06V 10/25; G06T 7/20; G06T 7/70; G06T 7/277; G06T 2207/30196; G06T 2207/30252
(Continued)

(56) References Cited

U.S. PATENT DOCUMENTS

2008/0304707 A1* 12/2008 Oi .......................... G06V 20/10
382/103
2009/0080701 A1    3/2009 Meuter et al.
(Continued)

FOREIGN PATENT DOCUMENTS

| CN | 111640140 A | 9/2020 |
| JP | 2009089365 A | 4/2009 |
| JP | 2013156671 A | 8/2013 |

OTHER PUBLICATIONS

Behavioral Pedestrian Tracking Using a Camera and LiDAR Sensors on a Moving Vehicle by Dimitrievski, Martin, Veelaert, Peter, Philips, Wilfried, Sensors (Basel, Switzerland), 19(2), 391, Jan. 18, 2019 (Year: 2019).*
(Continued)

*Primary Examiner* — Michael Robert Cammarata
*Assistant Examiner* — Heath E. Wells
(74) *Attorney, Agent, or Firm* — Tucker Ellis LLP

(57) ABSTRACT

An external recognition device that detects and tracks a moving object includes an object position detection unit that detects a position of the moving object as an observation value, based on an image; a region determination unit that determines a region to which the moving object belongs in the image, based on the observation value; an observation error setting unit that calculates an error to an observation value, based on a determination result; a state prediction unit that predicts a state of the moving object at a current time, based on the observation value up to a previous time that is a time earlier than the current time and the error; an association unit that associates the state of the moving object at the current time with the observation value; and a state update unit that updates the state of the moving object, based on a result of the association.

10 Claims, 12 Drawing Sheets

(51) Int. Cl.
*G06T 7/70* (2017.01)
*G06V 10/25* (2022.01)

(58) Field of Classification Search
USPC .......................................................... 382/181
See application file for complete search history.

(56) References Cited

U.S. PATENT DOCUMENTS

| | | | |
|---|---|---|---|
| 2011/0228985 A1* | 9/2011 | Uchida | G06T 7/215 |
| | | | 382/103 |
| 2015/0235093 A1* | 8/2015 | Shima | G06T 7/254 |
| | | | 382/103 |
| 2016/0335489 A1* | 11/2016 | Shigemura | G06V 40/103 |
| 2016/0364619 A1* | 12/2016 | Ogata | G06T 7/50 |
| 2017/0140229 A1* | 5/2017 | Ogata | B60W 30/0956 |
| 2017/0262734 A1* | 9/2017 | Nakata | B60W 30/09 |
| 2018/0012068 A1* | 1/2018 | Tanaka | G06V 20/58 |
| 2018/0012368 A1* | 1/2018 | Tanaka | G06T 7/254 |
| 2019/0102642 A1* | 4/2019 | Tanabe | H04N 13/239 |
| 2019/0279374 A1* | 9/2019 | Kim | B60W 40/04 |
| 2020/0051230 A1* | 2/2020 | Ozaki | B60R 21/00 |
| 2020/0311967 A1* | 10/2020 | Okada | G06T 7/74 |
| 2021/0237768 A1* | 8/2021 | Tateishi | B60W 60/001 |
| 2022/0187841 A1* | 6/2022 | Ebrahimi Afrouzi | |
| | | | G05D 1/0274 |
| 2022/0383535 A1 | 12/2022 | Su et al. | |
| 2023/0011485 A1* | 1/2023 | Levisse | F02C 7/06 |

OTHER PUBLICATIONS

Japanese Office Action from corresponding Application No. 2021-208698 mailed on Oct. 29, 2024, 7 pages with translation.
French Search Report from corresponding Application No. 2201044 mailed Mar. 7, 2025, 14 pages with translation.

* cited by examiner (WORLD COORDINATE)

FIG.9
(SIDE VIEW)
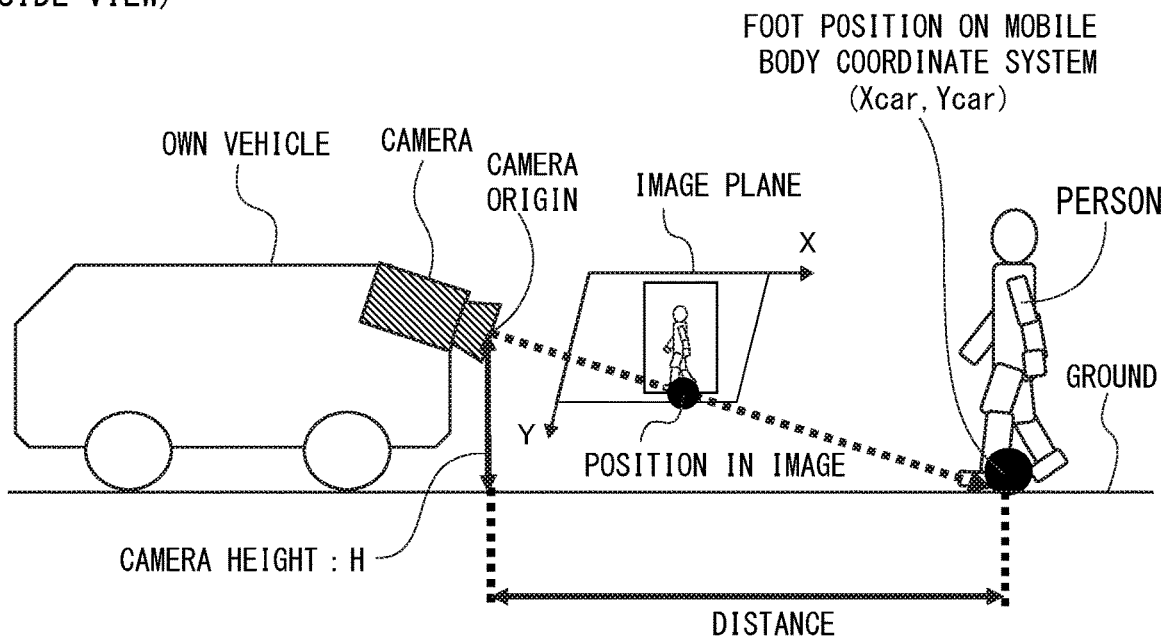
(PLAN VIEW)
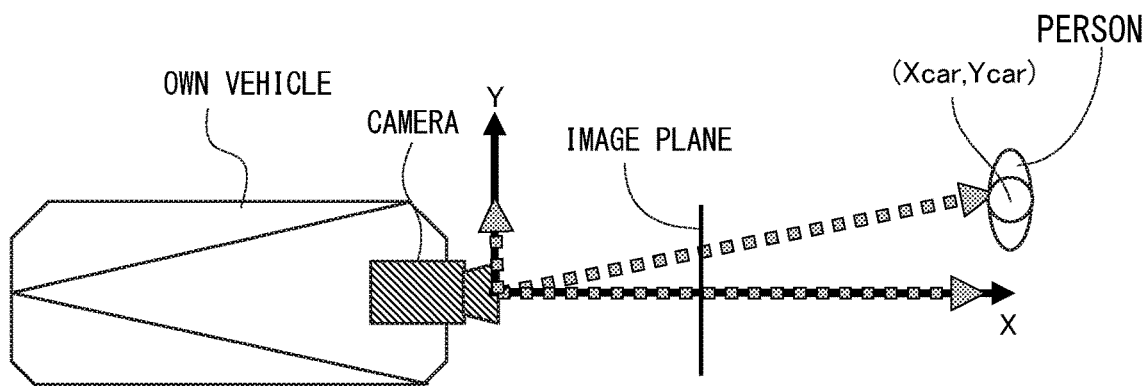

STATE MANAGEMENT
TABLE BEFORE UPDATING

| INDEX | TRACKING STATE (t-1) |
|---|---|
| 1 | BEING-TRACKED |
| 2 | BEING-TRACKED |
| 3 | TRACKING CANDIDATE |
| 4 | INVALID |
| 5 | INVALID |
| 6 | INVALID |
| 7 | INVALID |

UPDATE

STATE MANAGEMENT
TABLE AFTER UPDATING

| INDEX | TRACKING STATE (t) |
|---|---|
| 1 | BEING-TRACKED |
| 2 | BEING-INTERPOLATED |
| 3 | BEING-TRACKED |
| 4 | TRACKING-START |
| 5 | INVALID |
| 6 | INVALID |
| 7 | INVALID |

EXTERNAL RECOGNITION DEVICE

CROSS-REFERENCE TO RELATED APPLICATION

The present application is based on and claims a priority benefit of Japanese patent application No. 2021-018600, filed on Feb. 8, 2021, the disclosure of which is hereby incorporated herein by reference in its entirety.

FILED OF THE INVENTION

The present disclosure relates to an external recognition device

BACKGROUND

Currently, various driving support systems have been developed and commercialized. One of such driving support systems is a collision damage mitigation brake system. The collision damage mitigation brake system needs to, by a sensor installed in the vehicle, accurately detect an object (moving object) moving in the vicinity of a vehicle, and track the moving object.

A technique using a Kalman filter is known as a technique for tracking a moving object. The technique using a Kalman filter can predict the position of a moving object at a time later than a predetermined time, based on positional change of the moving object up to the predetermined time.

However, this technique reduces the accuracy of a prediction when an observation error relative to an obtained observation (the position of a detected moving object) cannot be accurately set. When using information on a moving object detected based on an image, the magnitude of an observation error varies depending on a position where the moving object is detected in the image. Moreover, a moving object to be a tracking target may come outside an image and may not be able to be detected depending on the angle of view and mounting angle of a camera that captures an image. In these cases, there is fear that tracking of a moving object will fail, and an own vehicle will collide with the moving object.

The following technique has been suggested as a method of tracking a moving object, particularly, a person by use of a camera mounted on a mobile body (e.g., see JP 2009-089365 A).

Specifically, images of the periphery of a mobile body are captured at constant time intervals by a camera device mounted on a mobile body within the viewing field of the camera device. Then, an image processing system specifies pixels corresponding to the moving object that is a tracking target, based on a plurality of precedent and subsequent images in a time series that are obtained by the capturing.

For each moving object, a pixel which corresponds to a spatial point where the moving object makes contact with the surface of a road and which represents a projection to image coordinates is specified. The movement of the spatial point which makes contact with the road surface is tracked by a state estimator using at least a four-dimensional state vector with, as the components thereof, the position of the spatial point making contact with the road surface and a relational velocity of the road surface.

The tracking of the movement by the state estimator is performed by a step of generating a prediction for each state vector, a step of converting into image coordinates via a projection equation suited to the prediction, a step of calculating an error expected in the prediction, within the image coordinates by a covariance matrix, and a step of updating by comparing the prediction with a pixel extracted within a more recent image. A moving object is tracked by the tracking of movement.

SUMMARY

A system, such as a collision damage mitigation brake system, that estimates an amount of time until collision by calculating a distance from the position of a moving object around an own vehicle, and automatically applies the brakes based on the estimated amount of time when there is a risk of collision needs to correctly measure a distance to the moving object, and track the moving object. Thus, in order to achieve the collision damage mitigation brake system, it is important not only to continuously track but also not to track a wrong detection result.

When the art suggested by JP 2009-089365 A is applied to an automatic parking system, an error expected for an observation value becomes great in the vicinity of an own vehicle, and the most recent position of the own vehicle is associated with a deviated detection result. As a result, a distance to a moving object being tracked cannot be correctly measured, and there is therefore fear that an own vehicle collides with the moving object.

The present disclosure has been made in view of the above circumstances, and is directed to provide an external recognition device that can perform highly accurate tracking of a moving object, based on an image acquired by a camera.

The present disclosure provides an external recognition device configured to detect and track a moving object around a mobile body equipped with a camera, the external recognition device including: an object position detection unit configured to detect a position of the moving object as an observation value, based on an image captured by the camera; a region determination unit configured to determine a region to which the moving object belongs in the image, based on the observation value detected by the object position detection unit; an observation error setting unit configured to calculate an error relative to an observation value, based on a result of a determination by the region determination unit; a state prediction unit configured to predict the state of the moving object at a current time, based on the observation value up to a previous time that is a time earlier than the current time, and an error calculated by the observation error setting unit; an association unit configured to associate the state of the moving object at the current time predicted by the state prediction unit with the observation value detected by the object position detection unit; and a state update unit configured to update the state of the moving object, based on a result of the association by the association unit.

BRIEF DESCRIPTION OF DRAWINGS

FIG. 9 is a diagram illustrating a method of calculating a distance to an own vehicle from the position of a detection result in an image.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, a specific embodiment of an external recognition device according to the present disclosure is described with reference to the drawings.

First Embodiment

Figure 1:
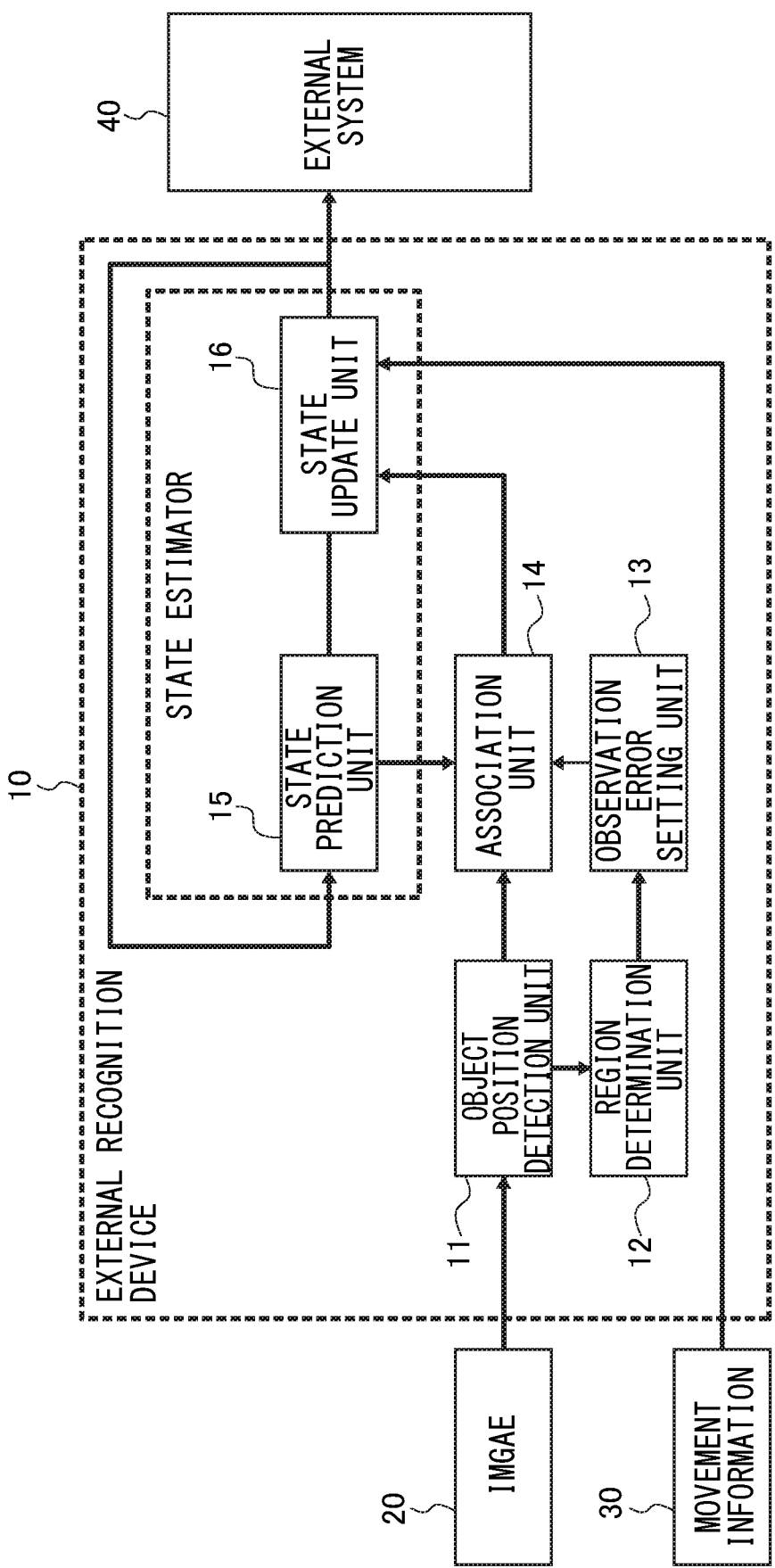
FIG. 1 is a block diagram illustrating an external recognition device according to one embodiment of the present disclosure.

FIG. 1 is a block diagram illustrating an external recognition device 10. The illustrated external recognition device 10 is one embodiment of an external recognition device according to the present disclosure. The external recognition device 10 is installed in a mobile body such as an automobile. Hereinafter, a mobile body in which the external recognition device 10 is installed is referred to as an own vehicle and described accordingly.

The external recognition device 10 is used in combination with an external system 40. Moreover, the external recognition device 10 operates at a predetermined cycle, for example, a cycle of every 100 ms of time. Then, the external recognition device 10 has a function of acquiring, from an own vehicle, vehicle information such as a velocity, a steering wheel angle, and states of a gearshift and a brake, and a function of acquiring an image captured by a camera.

As illustrated in FIG. 1, the external recognition device 10 includes an object position detection unit 11, a region determination unit 12, an observation error setting unit 13, an association unit 14, a state prediction unit 15, and a state update unit 16. The external recognition device 10 has, for example, a CPU, a GPU, a RAM, a ROM, and others, and achieves the functions of the object position detection unit 11 and others described above, by deploying, to the RAM, a predetermined program stored in the ROM and executing the program with the CPU. In addition, the external recognition device 10 may achieve some or all of the functions thereof by use of hardware such as an FPGA or an ASIC.

An image 20 captured by a camera mounted on an own vehicle, and movement information 30 acquired from the own vehicle via a CAN or the like are input to the external recognition device 10. The image 20 is sequentially acquired at a predetermined frame rate by a camera installed in the own vehicle. The movement information 30 is information relating to the movement of an own vehicle obtained from the own vehicle and information equivalent to the information relating to the movement, and includes, for example, a vehicle velocity, a steering wheel angle, a vehicle turning radius, the states of an accelerator and a brake, and the state of a shift lever. The movement information 30 is also sequentially acquired at a predetermined cycle, similarly to as with the image 20.

Figure 2:
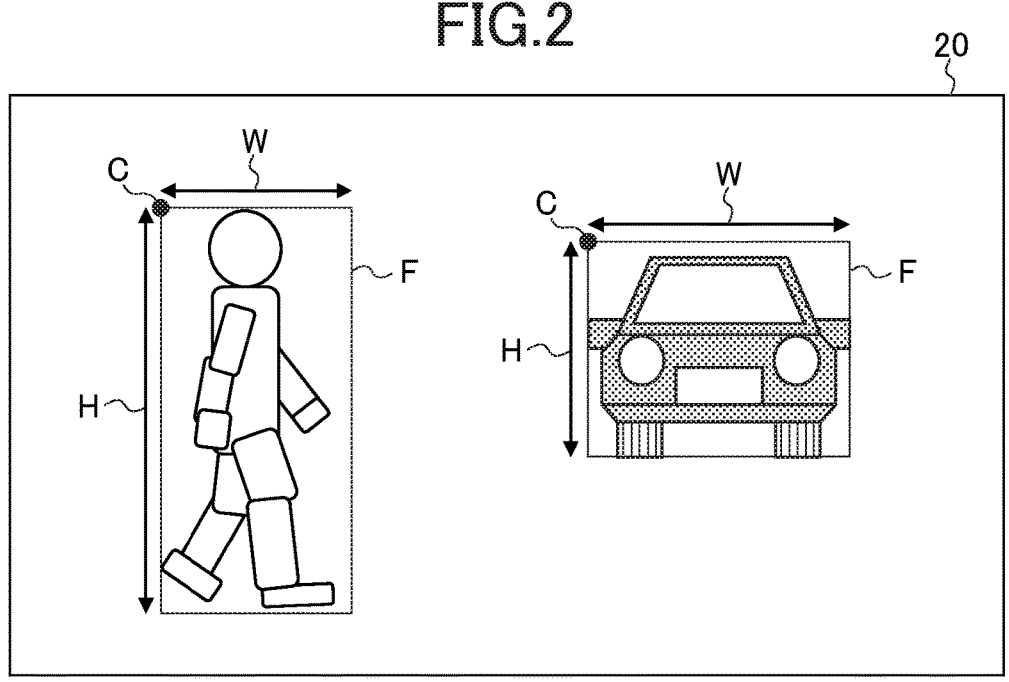
FIG. 2 is a schematic diagram in which a person and a vehicle are an example of a detection result of a moving object.

The object position detection unit 11 detects a desired moving object (moving object) such as a person or a vehicle by use of a well-known technique such as pattern matching, based on the image 20. FIG. 2 is a schematic diagram in which a person and a vehicle are an example of a detection result of a moving object.

As illustrated in FIG. 2, a detection result of a moving object is information specifying the position of a moving object (a person or a vehicle) in an image. Specifically, a detection result of a moving object is information that defines a rectangular frame F surrounding a moving object and that is prescribed by a height H being a dimension of the rectangular frame F in a perpendicular (vertical) direction, a width W being a dimension of the rectangular frame F in a horizontal (lateral) direction, and the position of an origin C of the rectangular frame F being a specific corner portion (in the present embodiment, an upper left corner portion) of the rectangular frame F. The object position detection unit 11 outputs a detection result to the region determination unit 12 and the association unit 14.

Figure 3:
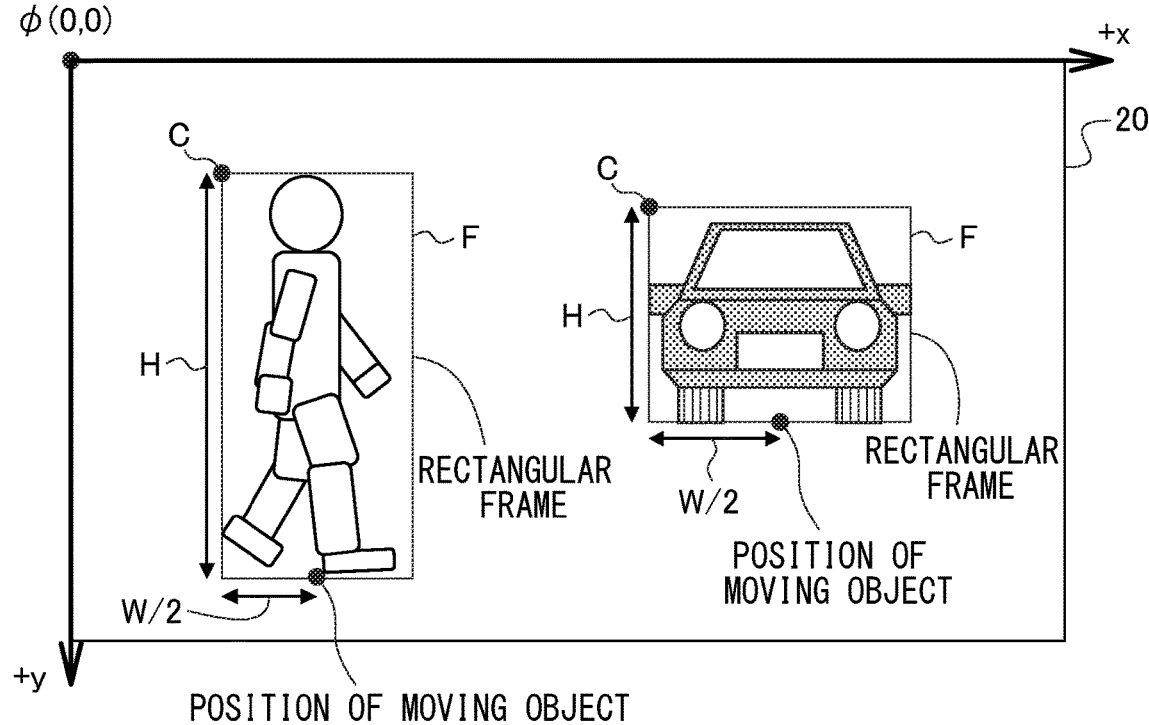
FIG. 3 is a diagram illustrating the definition of the position of a detection result in an image.

FIG. 3 is a schematic diagram illustrating a position in the image 20 (an upper left corner portion is an image origin O (0, 0), a horizontal rightward direction is the positive direction of an x-axis, and a perpendicular downward direction is the positive direction of a y-axis) of a detected moving object. The region determination unit 12 determines, by the detection result input from the object position detection unit 11, which region in the image 20, when the image 20 is divided into a plurality of regions, a detected moving object (detection moving object) belongs to.

Here, as illustrated in FIG. 3, it is assumed that the representative point of the position of the detection moving object is a horizontal center point (a position that is at the height H of the rectangular frame F from the origin of the rectangular frame F, and that is half the width W of the rectangular frame F) in the lower edge of the rectangular frame F specified by the object position detection unit 11 described above. Then, the region determination unit 12 outputs a region to which this representative point belongs in the image 20 to the observation error setting unit 13 as the position of the moving object.

The observation error setting unit 13 determines, based on a result in the region determination unit 12, an error supposed to be included in an observation value (the position of the moving object detected by the object position detection unit 11 based on the image 20). Moreover, when a region is determined, based on a result of the region determination unit 12, to be a region that cannot be detected by pattern recognition by pattern matching due to a foot loss or a sight loss in which a part of a foot part (a foot, a lower portion of a tire, or the like) of the detection moving object is not captured in an image, the observation error setting unit 13 sets a value representing that the detection is invalid. Then, the observation error setting unit 13 outputs, to the association unit 14, the set value representing an error or invalidity.

The association unit 14 associates the position (moving object predictive position) of the moving object at a current time, predicted by the state prediction unit 15 of a state estimator, based on the detection result input from the object position detection unit 11 and an observation error set by the observation error setting unit 13. In this instance, when there is no moving object predictive position that can be associated, the moving object is designated as a newly detected moving object (new detection moving object). The association unit 14 outputs, to the state update unit 16, a result of the association here and information on the new detection moving object.

The state prediction unit 15 predicts, based on the state of the detection moving object obtained by updating in the state update unit 16, the state of the moving object at a current time, by utilizing a result detected by the object position detection unit 11 up to a time (previous time) earlier than the current time. Here, it is assumed that a state has at least a position and a velocity. A prediction result by the state prediction unit 15 is utilized in the association unit 14.

The state update unit 16 starts state updating utilizing a result of associating results of the state prediction unit 15 and the object position detection unit 11 in the association unit 14, and tracking of the moving object designated as a new detection moving object. An updated state is output to the external system 40, and the external system 40 measures, by this result, an amount of time required until collision, based on, for example, the distance between an own vehicle and a person (an example of a moving object), and utilizes the amount of time in a system that automatically actuates a brake in such a manner that the own vehicle can be stopped within the time required until collision.

Figure 4:
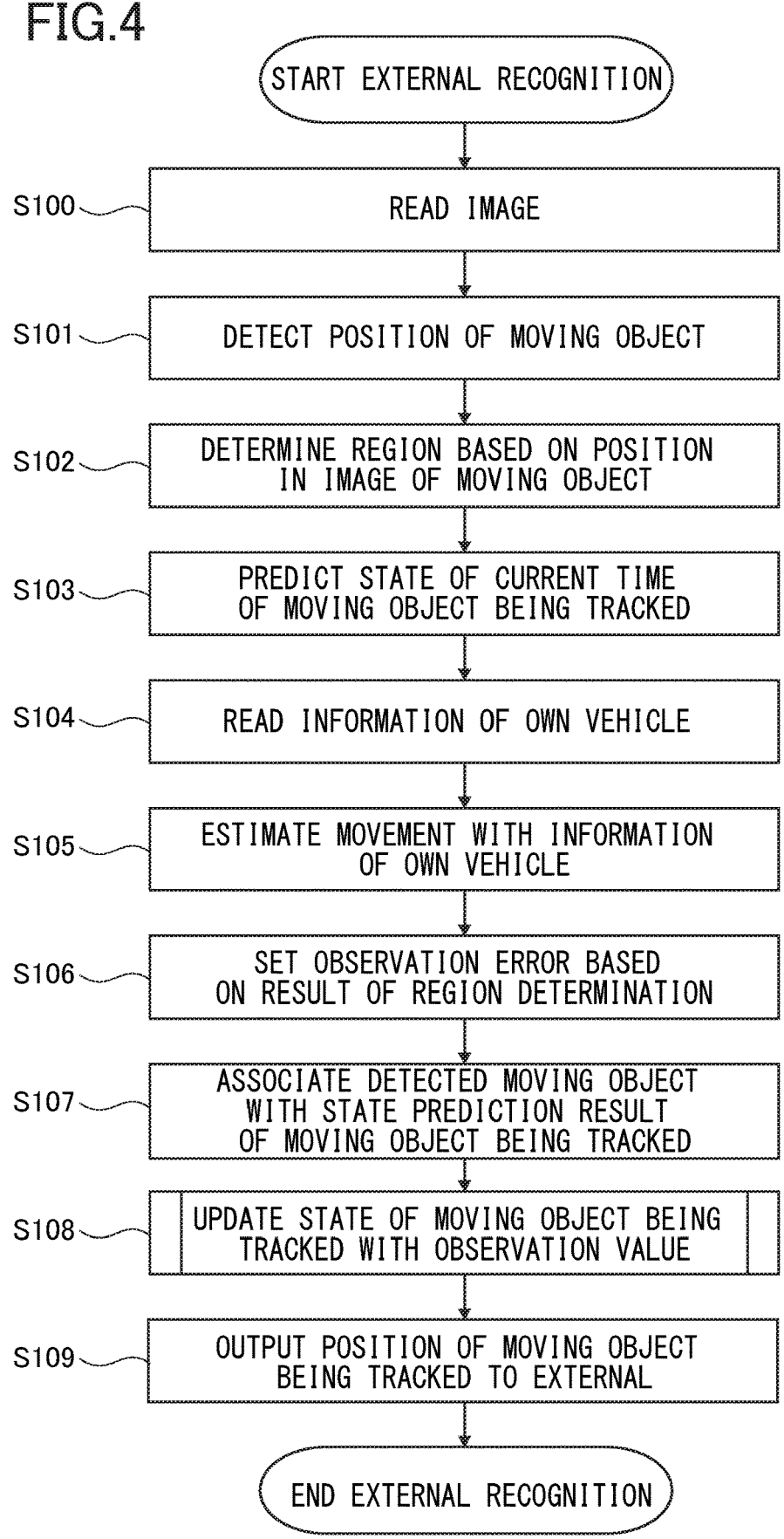
FIG. 4 is a flowchart illustrating a flow of processing according to First Embodiment.

Next, the operation of the external recognition device 10 is described with reference to a flowchart. FIG. 4 is a flowchart illustrating a flow of the whole processing by the external recognition device 10. Moreover, the present embodiment is described supposing a state where a camera is installed in the rear part of an own vehicle.

Before the description of the flowchart, a coordinate system (a global coordinate system, a mobile body coordinate system) used in the processing of the external recognition device 10 is described.

Figure 5A:
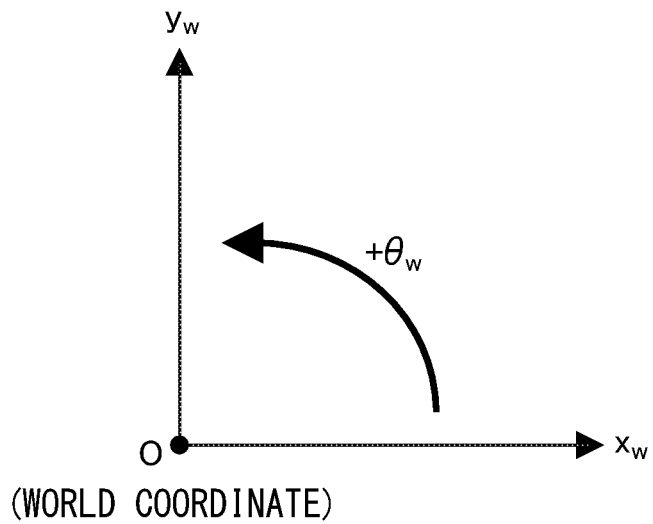
FIG. 5A is a diagram illustrating the definition of a global coordinate system.
Figure 5B:
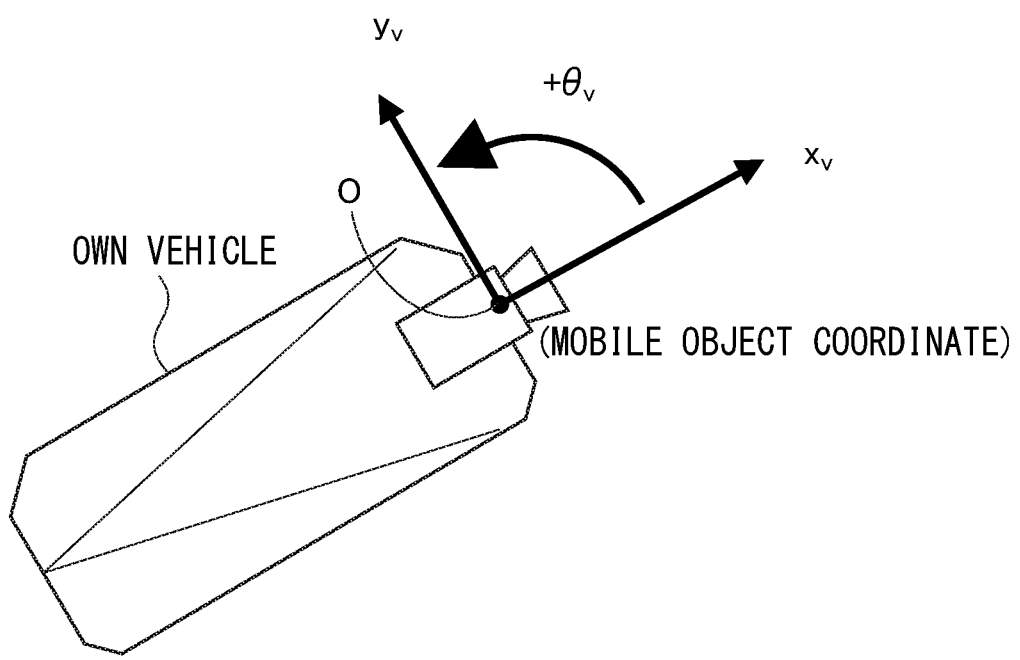
FIG. 5B is a diagram illustrating the definition of a mobile body coordinate system.

FIG. 5A is a diagram illustrating a global coordinate system in which the position of an own vehicle when the external system 40 is started up is an origin, and in which the rear side of the own vehicle at the start of the external system 40 is $+x_w$, the side to $+x_w$ is $+y_w$, and rotation from $+x_w$ to $+y_w$ is a value on a two-dimensional x-y plane being $+\theta_w$. FIG. 5B is a diagram illustrating a mobile body coordinate system that the external recognition device 10 uses to represent the position and orientation of an own vehicle, in which the rear side of the own vehicle is $+x_v$, the side to $+x_v$ is $+y_v$, and rotation from $+x_v$ to $+y_v$ is a value on a two-dimensional x-y plane being $+\theta_v$. In the mobile body coordinate system, the + direction of an x-axis, the + direction of a y-axis, and the + rotation direction of θ are the same as those of global coordinates, but the origin moves according to the movement of an own vehicle.

Next, the flowchart of FIG. 4 is described. The whole processing of the flowchart is initiated by the startup of the external system 40.

One example illustrated in the flowchart of FIG. 4 is described assuming that a monocular camera (hereinafter, simply referred to as a camera) mounted in an own vehicle to face in the rearward direction of the own vehicle is utilized. Moreover, it is assumed that a cycle for data acquired from this camera and the own vehicle is 33 ms. Moreover, it is assumed that a size of an image obtained by the camera is lateral (width) 640 pixels×vertical (height) 400 pixels. Vehicle information is information that is needed to calculate how the own vehicle has moved. Further, a model supposing uniform motion is utilized as a model of predicting the position of a detection target moving object.

In step 101 (S101), the object position detection unit 11 detects a moving object that can be a tracking target, based on the image 20 read in S100. Here, it is assumed that tracking target moving objects are, for example, a person and a vehicle.

In the present embodiment, detection of a moving object that can be a tracking target utilizes Histograms of Oriented Gradients (HoG) and a Support Vector Machine (SVM), both being a well-known technique.

Here, HoG is gradient strength that is calculated for each gradient direction of a pixel value of a local region and converted into a histogram, and a conversion of this histogram into a feature amount is referred to as a HoG feature amount. The HoG feature amount uses gradient as a feature amount, and has the advantage of being robust against a scale change of the image 20. On the other hand, the HoG feature amount has the disadvantage of being weak against a rotational change.

An SVM is a classifier that classifies an input into a correct answer or an incorrect answer. The SVM learns a boundary for classifying into a correct answer or an incorrect answer by learning the relation between data and a label, based on a set of a large amount of data and a label, and when unknown data is input, the SVM determines whether input data is a correct answer or an incorrect answer by utilizing the learned boundary.

In the present embodiment, a classifier is generated by learning a HoG feature amount and each of labels of the person and the vehicle. Moreover, as illustrated in FIG. 2, a detection result is supposed to be the width W and the height H for drawing the rectangular frame F surrounding an origin of the detection result and the detection result, and a label such as a person and a vehicle.

Each art is well known, and the detailed description is therefore omitted. Moreover, any other well-known techniques such as pattern recognition may be used as a technique for detecting a person or a vehicle, and the detection technique is not limited to the technique described above. Moreover, as a moving object, objects other than a person or a vehicle may be a detection target or a tracking target.

In S101 of the flowchart, the position of a moving object in the image 20 is detected by a detection result of the moving object as in FIG. 3. As illustrated in FIG. 3, in coordinates of the image 20, the downward direction of the image 20 is +y, and the rightward direction of the image 20 is +x. A position (x, y) in the image is the addition of width W/2 (x-axis direction) and the height H (y-axis direction) to the image origin O (0, 0).

Figure 6:
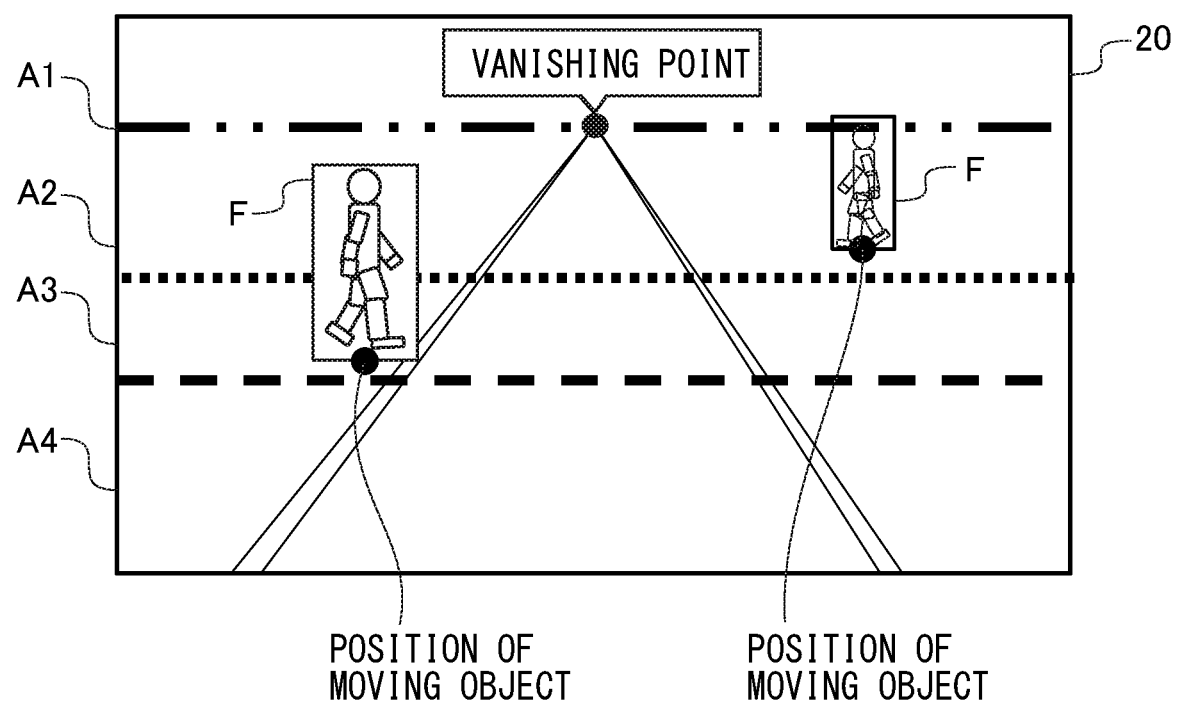
FIG. 6 is a diagram illustrating one example of divided regions of an image.
Figure 7A:
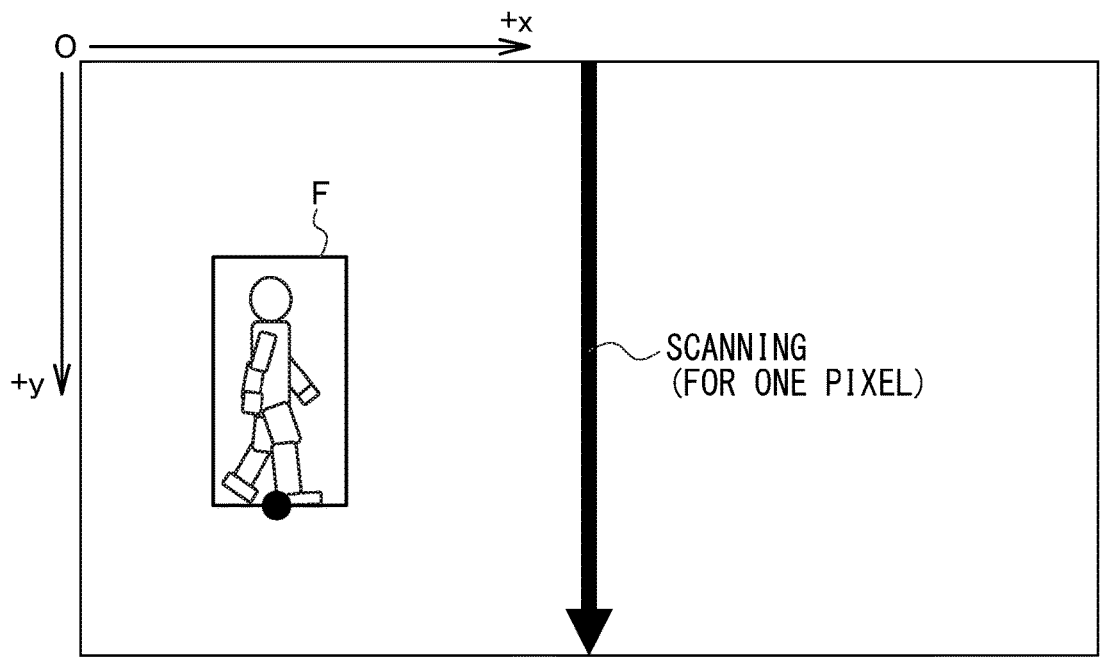
FIG. 7A is a schematic diagram illustrating how an image is vertically scanned, as one example of a criterion of dividing a region.
Figure 7B:
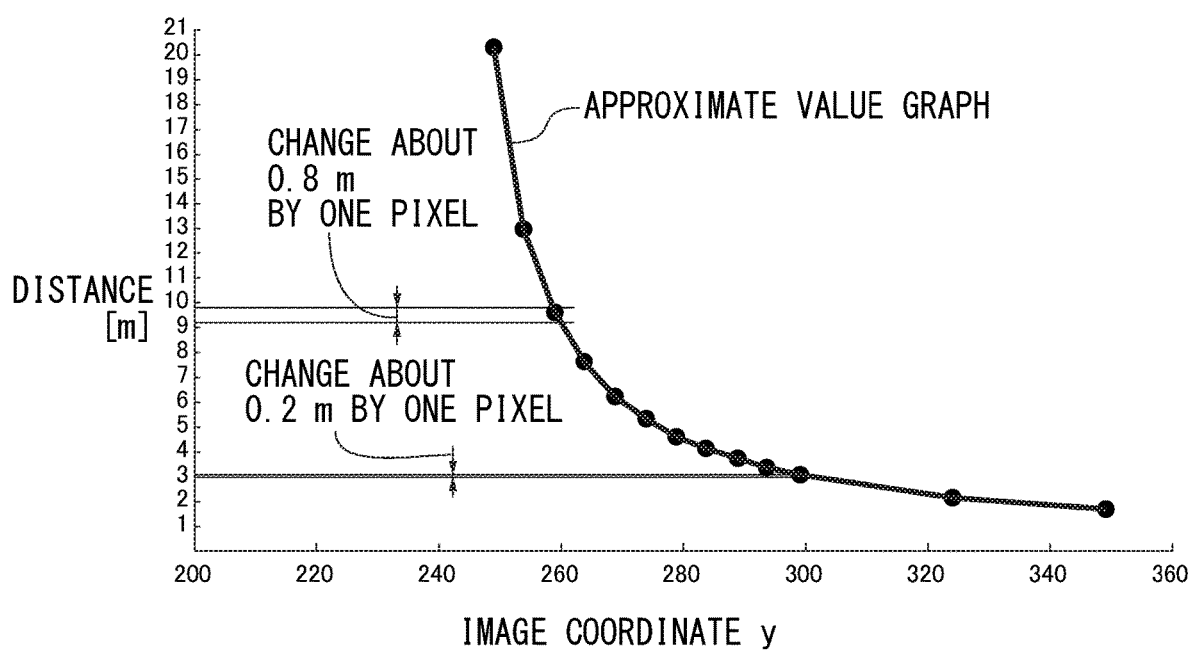
FIG. 7B is a graph in which an association relation of how much a distance to a person changes is derived by calculation each time a y-coordinate in an image changes one [pixel] by scanning in FIG. 7A, and approximated by a curve.

FIG. 6 is a diagram illustrating one example of divided regions A1, A2, A3, and A4 of the image 20. FIG. 7A is a schematic diagram illustrating how the image 20 is vertically scanned, as one example of a criterion of dividing a region. FIG. 7B is a graph in which an association relation of how much a distance to a person changes is derived by calculation each time a y-coordinate in the image 20 changes one pixel by scanning in FIG. 7A, and approximated by a curve.

The determination of a region in S102 is processing of determining which region the position of a detection result (moving object) belongs to, when the image 20 is separated into, for example, the four vertical regions A1, A2, A3, and A4, as illustrated in FIG. 6. The division into the regions A1 to A4 determines an error of a distance corresponding to one pixel deviation for each position in the y-axis direction in the image 20, based on, for example, the distortion of a lens of a camera and the mounting orientation of the camera to an own vehicle, and based on the curve in FIG. 7B.

The example of FIG. 6 is separated into the four regions A1, A2, A3, and A4. The region A1 is a region in which an error of a distance of several meters occurs due to the deviation of the position of a detection moving object by one pixel, or in which the sky is contained. The region A2 is a region in which an error that is smaller than that in the region A1 but relatively great occurs due to the deviation of the position of a detection moving object by one pixel. The region A3 is a region in which an error that is smaller than that in the region A2 occurs due to the deviation of the position of a detection moving object by one pixel. The region A4 is a region in which distances to an own vehicle and a detection target are physically close, and in which it is considered that the detection target cannot be correctly detected.

Moreover, a criterion (boundary) of division of separating into the four regions A1, A2, A3, and A4 is set so that a part higher than a vanishing point (see FIG. 6) in the image 20 is the region A1, a part up to the region A1 from a spot where a detection position of a distance of about 0.8 m on the mobile body coordinate system changes due to an error of one pixel is the region A2, a part up to the region A2 from a spot where a detection position of a distance of about 0.2 m on the mobile body coordinate system changes from the region A2 due to an error of one pixel is the region A3, and a part lower than the region A3 is the region A4.

The region determination unit 12 determines which of the regions A1 to A4 the position of the detection result in the image 20 is in (S102), and outputs the determination to the observation error setting unit 13. Further, a detection moving object at a position such as the region A1 where a detection error is extremely great or a detection moving object the position of which is considered not to be on the ground is not targeted for tracking and is deleted.

Here, the method of dividing into the regions A1 to A4 is not limited to the method of utilizing a physical parameter such as the distortion of a lens of a camera and a mounting position of the camera. Moreover, the regions A1 to A4 to be divided may be a mixture of not only vertical divisions but also lateral divisions, and the number of divisions is not limited to four either.

In S103, the position of a moving object being tracked by the state estimator at a current time on a global coordinate system is predicted. While a Kalman filter, an extended Kalman filter, an unscented Kalman filter, and the like are used as state estimators, a Kalman filter is utilized in the example described in the present embodiment.

First, the Kalman filter in the present embodiment utilizes a uniform motion model, and a state to be estimated is therefore a four-dimensional vector x=(x, y, vx, vy). Moreover, x, y indicates the position on the global coordinate system, and vx, vy indicates a velocity on the global coordinate system. The position on the global coordinate system at a current time and a value of an error covariance matrix for this position are predicted by Equations (1) and (2) below.

Equation (1)

$$x_t^- = F * x_{t-1}^+ \tag{1}$$

Equation (2)

$$P_t^- = F * P_{t-1}^+ * F^t + Q \tag{2}$$

Here, the subscript/superscript t represents a time, – represents being a predictive value, and + represents being a value updated based on observation. Moreover, in Equations (1) and (2), F and Q respectively represent a state transition matrix and a system noise, and are represented by Equations (3) and (4) in the present embodiment.

Equation (3)

$$F = \begin{pmatrix} 1 & 0 & \Delta t & 0 \\ 0 & 1 & 0 & \Delta t \\ 0 & 0 & 1 & 0 \\ 0 & 0 & 0 & 1 \end{pmatrix} \tag{3}$$

Equation (4)

$$Q = \begin{pmatrix} \sigma^2_{systemnoise} & 0 & 0 & 0 \\ 0 & \sigma^2_{systemnoise} & 0 & 0 \\ 0 & 0 & \sigma^2_{systemnoise} & 0 \\ 0 & 0 & 0 & \sigma^2_{systemnoise} \end{pmatrix} \tag{4}$$

$\Delta t$ in Equation (3) is a processing cycle, and $\sigma^2_{sysytemnoise}$ in Equation (4) is an error supposed when the model according to the present embodiment is applied. The processing in S103 is performed for all the Kalman filters that are not in an invalid state.

In S104, the movement information 30 is acquired from the vehicle by any method such as a Control Area Network (CAN). Here, the movement information 30 is information that becomes necessary to calculate a movement distance in S105. For example, the movement information 30 includes information such as a velocity of an own vehicle, the number of rotations of a tire, and a steering amount of a steering wheel.

In S105, the position of the own vehicle is estimated by utilizing the movement information 30 acquired in S104. In the present embodiment, a vehicle position is estimated by Equations (5) to (8), by utilizing a movement distance calculated from the number of rotations of a tire and a tire diameter, and a turning radius estimated from a steering amount of a steering wheel. Here, the own vehicle supposes movement on a two-dimensional plane, and has three states of $pose_{car} = (x_{carpose}, y_{carpose}, \theta_{yaw})$.

Equation (5)

$$\rho_t = \frac{1}{R_t} \tag{5}$$

-continued

Equation (6)
$$\Delta\theta_{yaw_t} = \Delta S_t \cdot \rho_t \quad (6)$$

Equation (7)
$$\begin{pmatrix} x_{Carpose_t} \\ y_{carpose_t} \end{pmatrix} = \begin{pmatrix} x_{carpose_{t-1}} \\ y_{carpose_{t-1}} \end{pmatrix} + \Delta S_t \begin{pmatrix} \cos(\theta_{yaw_{t-1}}) \\ \sin(\theta_{yaw_{-1}}) \end{pmatrix} \quad (7)$$

Equation (8)
$$\theta_{yaw_t} = \theta_{yaw_{t-1}} + \Delta\theta_{yaw_t} \quad (8)$$

Here, t represents a time, R represents a turning radius, ρ represents a curvature, and a ΔS represents a movement distance. As a method of estimating the position of an own vehicle, a method that utilizes other models, Visual Odometry that estimates the position and orientation of an own vehicle by utilizing the image 20, or the like may be used.

In S106, an error of an observation result is set based on a result of a region determination. In the present embodiment, in relation to each of the regions A1 and A4, an invalid value as an error of an observation result is set as an invalid detection result. In relation to the region A2, an error is dynamically set as in FIG. 8. For the procedure of setting an error, first, an error x, y of a detection position supposed on an image is added to coordinates of the detection target in the image 20. Thereafter, the coordinates in the image 20 to which the error is added are projected on the mobile body coordinate system by utilizing the orientation of a camera and the height of the camera from the ground, in accordance with a pinhole camera model.

Figure 8A:
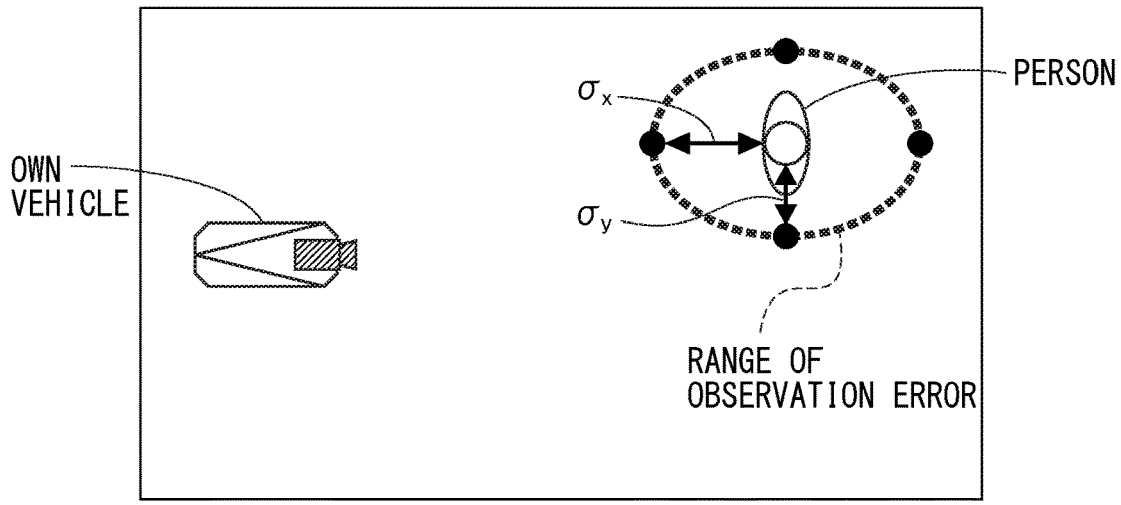
FIG. 8A is an overhead image illustrating an example of a case where a detection target (e.g., a person) is relatively far from an own vehicle.
Figure 8B:
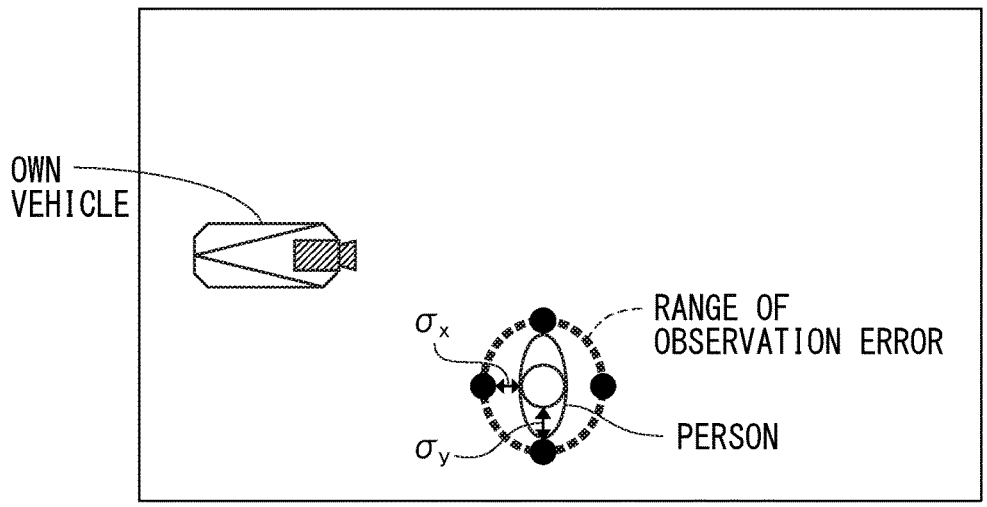
FIG. 8B is an overhead image illustrating an example of a case where a detection target (e.g., a person) is relatively close to an own vehicle.
Figure 8C:
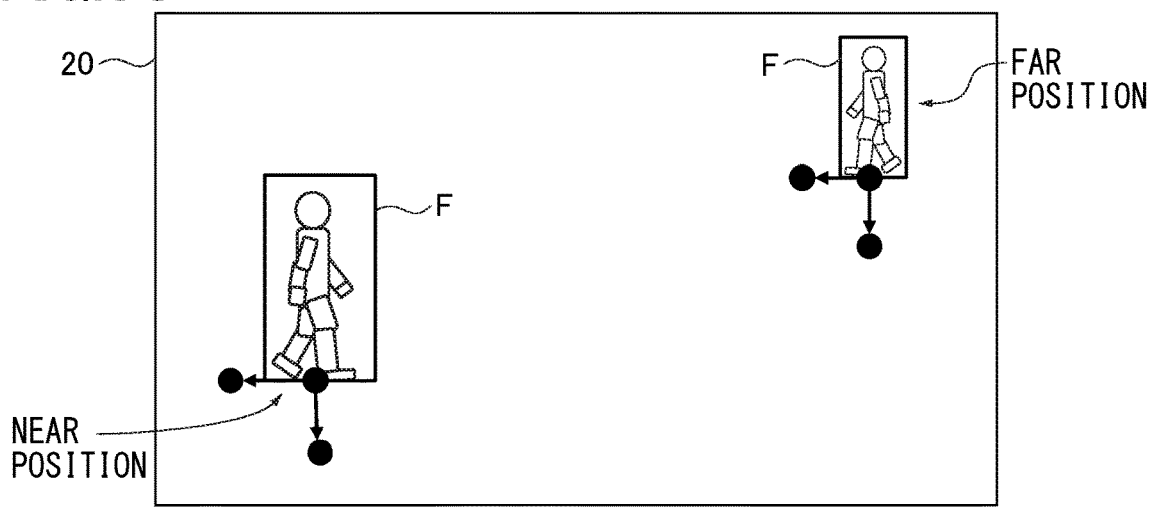
FIG. 8C is a diagram of a mobile body coordinate system on which the detection target illustrated in FIG. 8A and the detection target illustrated in FIG. 8B are each projected.

FIG. 8A is an overhead image illustrating an example of a case where a detection target (e.g., a person) is relatively far from an own vehicle. FIG. 8B is an overhead image illustrating an example of a case where a detection target (e.g., a person) is relatively close to an own vehicle. FIG. 8C is a diagram of a mobile body coordinate system on which the detection target illustrated in FIG. 8A and the detection target illustrated in FIG. 8B are each projected.

The coordinates in the image 20 to which the error is added are projected on the mobile body coordinate system, and then, when the detection target (e.g., a person) is relatively far from the own vehicle in the overhead image of FIG. 8A, the detection target is projected to a position far from the own vehicle as illustrated in FIG. 8C. On the other hand, when the detection target is relatively close to the own vehicle in the overhead image of FIG. 8B, the detection target is projected to a position close to the own vehicle as illustrated in FIG. 8C.

An average of differences in an x-direction in which an image center position projected on the mobile body coordinate system (FIG. 8C) with the addition of a supposed error is projected in a forward-backward direction relative to the own vehicle as a value of an observation error is a value of an observation error in the x-direction, and an average of differences in a y-direction in which the image center position is projected in a left-right direction is a value of an observation error in the y-direction.

An observation error is expressed as below to convert the movement of a detection target into a model by uniform motion. In the present embodiment, ax is an observation error in the forward-backward direction when seen from an own vehicle in accordance with the mobile body coordinate system, and $\sigma_y$ is an observation error in the left-right direction when seen from an own vehicle.

Equation (9)
$$R = \begin{pmatrix} \sigma_x^2 & 0 \\ 0 & \sigma_y^2 \end{pmatrix} \quad (9)$$

Moreover, when a y-position on the mobile body coordinate system changes due to the change of x-coordinates in an image, and contrarily, when an x-position on the mobile body coordinate system changes due to the change of y-coordinates, a covariance value may be set as follows.

Equation (10)
$$R = \begin{pmatrix} \sigma_x^2 & \dfrac{\sigma_x \sigma_y}{2} \\ \dfrac{\sigma_x \sigma_y}{2} & \sigma_y^2 \end{pmatrix} \quad (10)$$

In the region A3, when an observation error is set by the same method as in the region A2, it is conceivable that the value will become overly small. Thus, it is assumed that after an observation error is calculated by the same method as in the region A2, the observation error is compared with a preset minimum value, and the minimum value is utilized when the observation error is smaller than the minimum value.

Dynamically estimating and setting an observation error as described above has the effect of improving the trackability of a far tracking target, and reducing the trackability of a detection target that has been erroneously sensed in the vicinity of a vehicle.

Setting of an observation error by S106 is performed for all detection results in S101 that have become processing targets in S102.

In S107, a position at a current time, predicted by the state estimator, of the moving object being tracked is associated with a position, in the image 20, of the detection target detected from the image 20, based on a result of projecting on the global coordinate system.

FIG. 9 is a diagram illustrating a method of calculating a distance to an own vehicle from the position of a detection result in an image. As illustrated in FIG. 9, the calculation of the global coordinate system is performed by utilizing the height from the ground to an origin of a camera installed in an own vehicle, a mounting position of the camera to the own vehicle, the orientation of the camera, and an internal parameter of the camera, so that the intersection of the ground and a straight line connecting the camera origin and a position in the image 20 is a foot position ($x_{car}$, $y_{car}$) on the mobile body coordinate system, based on the pinhole camera model, and the supposition that a detected moving object is present on the same plane as the own vehicle.

Next, the foot position on the mobile body coordinate system obtained by the calculation is converted onto the global coordinate system. Since the global coordinate system is a coordinate system in which a position at the startup of the external system 40 is an origin, the conversion needs only to be done based on the position and orientation of the own vehicle at a current time. Thus, conversion from the mobile body coordinate system to the global coordinate system is performed by adding ($x_{carpose}$, $y_{carpose}$) derived by Equation (7) to the foot position on the mobile body coordinate system derived by the method illustrated in FIG. 9.

In addition, the value of an observation error is rotated according to the direction of the own vehicle. Here, when the present disclosure is implemented by utilizing a fixed camera, Equations (5) to (8) and Equations (11) and (12) do not need to be implemented because the global coordinate system defined in FIG. 5 and the mobile body coordinate system always correspond to each other.

Equation (11)

$$\begin{pmatrix} x_{world} \\ y_{world} \end{pmatrix} = \begin{pmatrix} x_{car} \\ y_{car} \end{pmatrix} + \begin{pmatrix} x_{carpose_t} \\ y_{carpose_t} \end{pmatrix} \quad (11)$$

Equation (12)

$$R' = R * \begin{pmatrix} \cos(\theta_{yaw_t}) & -\sin(\theta_{yaw_t}) \\ \sin(\theta_{yaw_t}) & \cos(\theta_{yaw_t}) \end{pmatrix} \quad (12)$$

Figure 10:
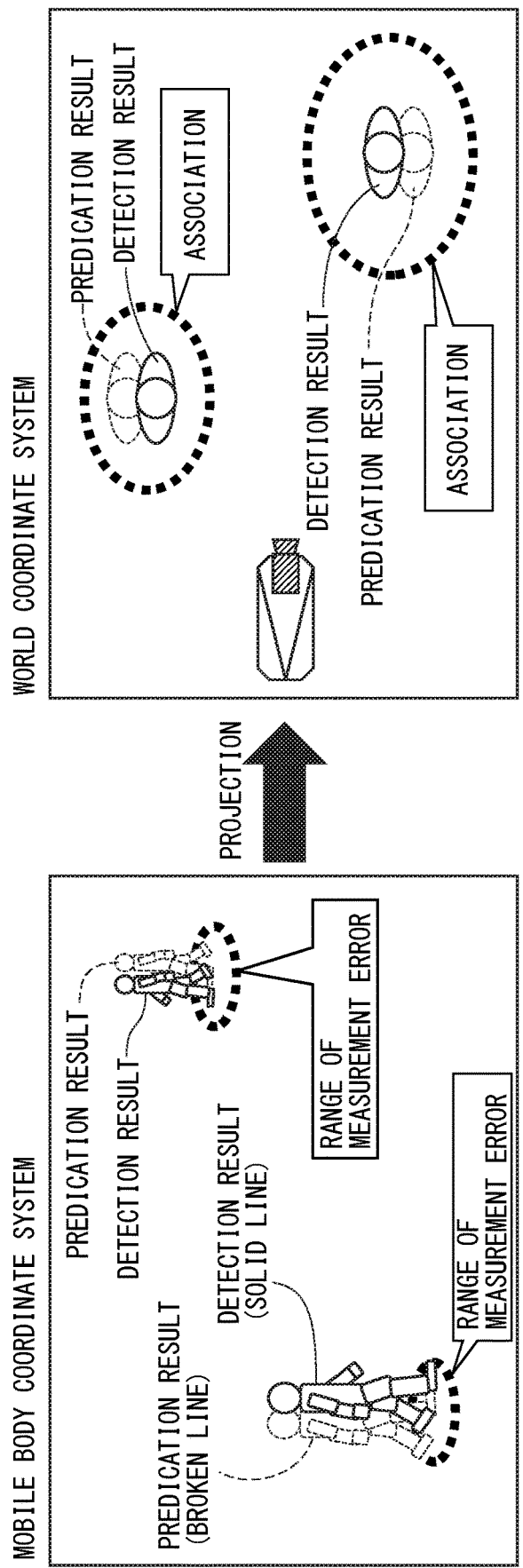
FIG. 10 is a diagram illustrating an example of association.

FIG. 10 is a diagram illustrating an example of association. After being subjected to coordinate conversion, all the results detected from the image are associated based on a position at a current time, predicted by the state estimator, of the moving object being tracked, and a position, detected from the image 20, of the detection target on the global coordinate system, as illustrated in FIG. 10.

In the present embodiment, a Mahalanobis distance that is one kind of distance used in statistics is utilized as an index of a distance for association. The Mahalanobis distance serves as an index suited to clarify the similarity of new data, based on a variance-covariance value of a certain data sample. The calculations of the Mahalanobis distance are shown below.

Equation (13)

$$P' = P^- + R' \quad (13)$$

Equation (14)

$$dist = (z_{pred} - z_{detect})^t P'(z_{pred} - z_{detect}) \quad (14)$$

Here, dist is a Mahalanobis distance, $z_{pred}$ is a predictive position ($x_{pred}$, $y_{pred}$) by a Kalman filter, and $z_{detect}$ is a position ($x_{world}$, $y_{world}$) of a moving object detected from the image 20. This processing is repeated by the number of the products of (the number of predictions of the Kalman filter) and (the number of moving objects detected from the image), and a Kalman filter predictive value that minimizes the Mahalanobis distance is associated with the moving object detected from the image 20.

In this instance, a plurality of Kalman filters may be associated with one moving object detected from the image 20. Unnecessary deletion of a Kalman filter is prevented by associating a plurality of Kalman filters with one moving object detected from the image 20.

Moreover, as other association methods, well-known techniques such as a Hungarian algorithm may be used. Moreover, a Euclidean distance or the like may be used as an association index.

Figure 11:
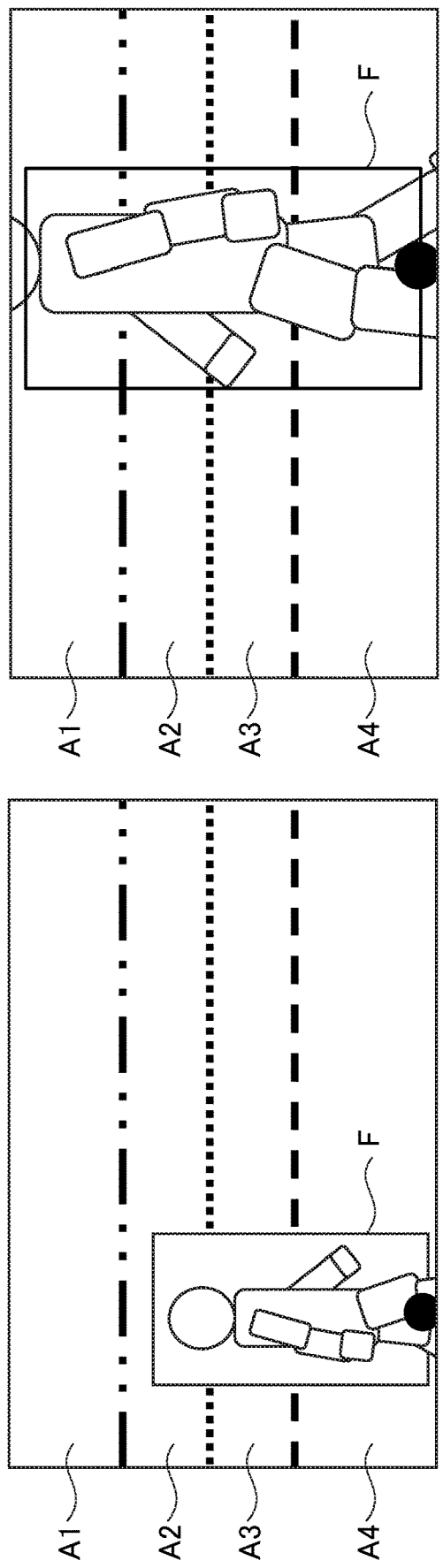
FIG. 11 is a diagram illustrating an example of a sight-loss result.

FIG. 11 is a diagram illustrating an example of a sight-loss result. In S107, a Kalman filter associated with a region (the region A4 in the embodiment) in which it is considered that the entire target is not contained due to the occurrence of a sight-loss as in FIG. 11 as a result of the region determination in S102 utilizes a predictive value of the Kalman filter to attempt detection by utilizing an alternative such as an optical flow or a median flow.

Here, when the detection was successfully performed by the alternative, a position on the global coordinate system and a Mahalanobis distance are calculated, based on the result detected by the alternative, by the processing in S107 and utilized as observation values.

In the detection by an optical flow, x, y is projected on the image 20 out of the internal state $x^-=(x, y, vx, vy)$ of a predictive value of the Kalman filter to draw the rectangular frame F, and a velocity vector in the rectangular frame F is calculated. For the width W and the height H necessary to draw the rectangular frame F, the height H and the width W included in an observation value last associated with the Kalman filter need only to be utilized.

Here, it is assumed that there is no observation value when, in the alternative means, detection ended in failure. Techniques such as the optical flow are well-known methods, and the description is therefore omitted.

In S108, the state of the moving object being tracked is updated by use of a detection result associated with the predictive value of the Kalman filter. In the present embodiment, the state of the Kalman filter is managed by five states: tracking-start, a tracking candidate, being-tracked, being-interpolated, and invalid.

For the tracking-start, the state of the Kalman filter is initialized to start tracking of a moving object detected in a state when the moving object is newly detected. The tracking candidate indicates a state where time has not elapsed since a detection start, and there is a high possibility that the internal state of the Kalman filter is not stable.

The being-tracked indicates a state where time has elapsed since a detection start, and the internal state of the Kalman filter is stable. The being-interpolated indicates that a tracking target is in an unsensed state for some reason after tracking of a detection moving object is started. The invalid indicates a state where a target Kalman filter is not tracking anything. Moreover, it is assumed that a Kalman filter has, as internal states, an internal state x, an error covariance matrix P, and an interpolation count Intp.

Figure 12:
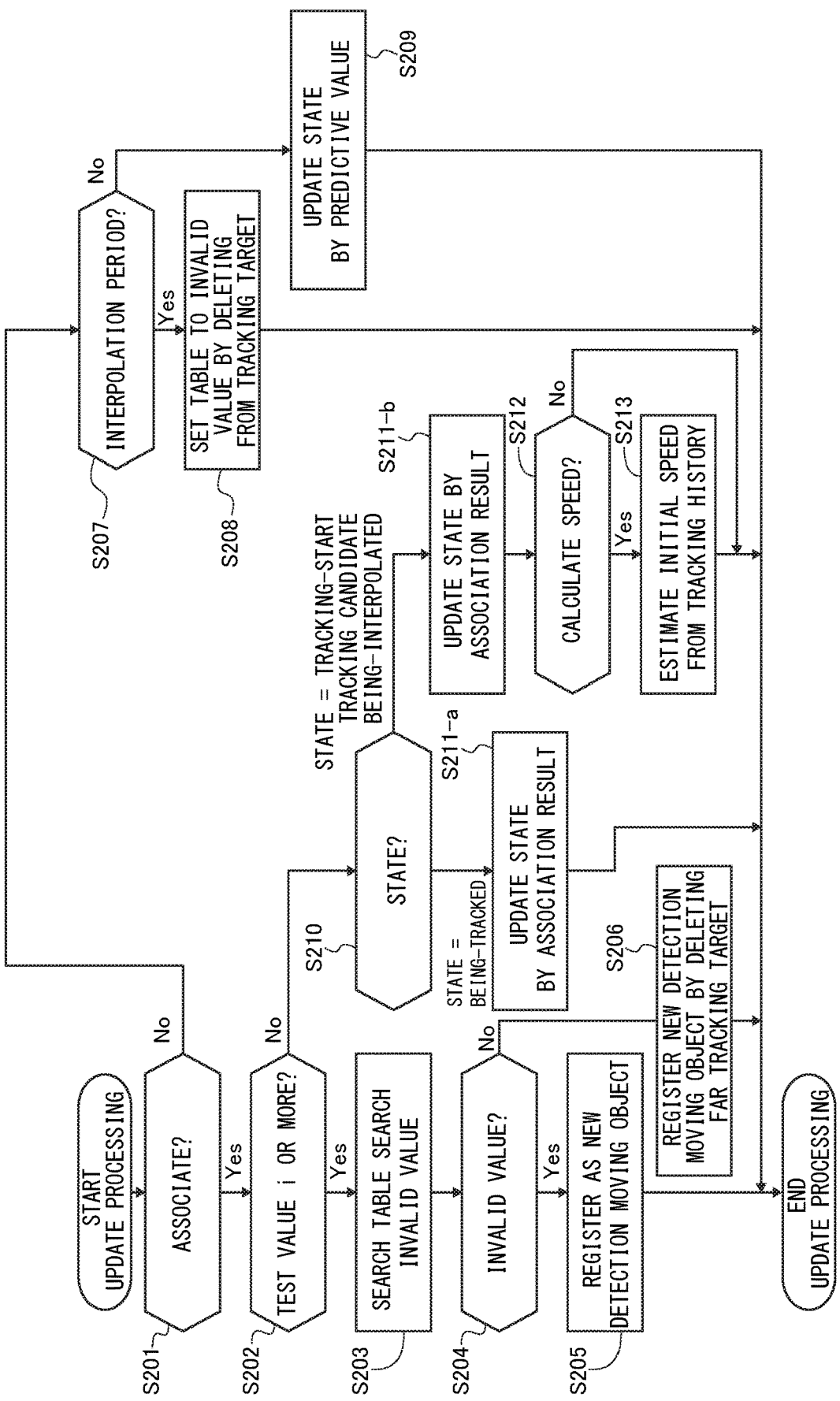
FIG. 12 is a flowchart of processing for updating a Kalman filter.

FIG. 12 is a flowchart of processing for updating a Kalman filter. As illustrated in FIG. 12, first, whether there is a detection result (observation value) associated with a Kalman filter is checked in S201. The flow shifts to S202 when there is an observation value, whereas the flow shifts to S207 when there is no observation value.

In S202, a rejection test is performed by utilizing a Mahalanobis distance calculated by Equation (14), based on a predictive value and an observation value of a Kalman filter. A chi-squared test was used for the rejection test. The chi-squared test is a statistical test performed on the supposition that a test statistic follows an $x^2$ distribution under a null hypothesis.

The present embodiment has a two-degree-of-freedom chi-squared distribution because a Mahalanobis distance is derived from (x, y). Since a level of significance is 5[%] in the present embodiment, a chi-squared value is 5.99146. When a Mahalanobis distance has a value of 5.99146 or more (or more than 5.99146), the flow shifts to S203 by determining that association is difficult to conceive from a predictive value. When a Mahalanobis distance has a value of less than 5.99146 (or 5.99146 or less), the flow shifts to S210.

Moreover, assuming that an association in which a chi-squared value is 5.99146 or more is an invalid association, an associated observation value is designated as a new detection moving object.

Figure 13:
FIG. 13 is a diagram illustrating an example of a state management table of a Kalman filter.

FIG. 13 is a diagram illustrating an example of a state management table of a Kalman filter. S203 is processing in the case of a new detection moving object, and one in an invalid state is searched for from a table (t-1) stored inside a program, as illustrated in FIG. 13.

Here, the flow shifts to S205 when there is an invalid value (=space in the table) (YES in S204), whereas the flow shifts to S206 when there is no invalid value (NO in S204). In S205, a Kalman filter is newly registered for tracking of a new detection moving object from within the table to a place of an invalid value, the internal state x and the error covariance matrix P are initialized, and the state of the table is then set to the tracking-start.

For the initialization of the internal state, the global coordinate system of an observation value is substituted as below. A velocity component is 0. A preset value, for example, 0.1 is substituted for the error covariance matrix P. For example, 0 is substituted for the interpolation count Intp.

Equation (15)

$$x = (x_{world}, y_{world}, 0, 0) \qquad (15)$$

S206 is processing when there is no space in the table. When there is no space in the table, a moving object being tracked that is considered most unnecessary is deleted in accordance with a predetermined criterion, and a newly detected moving object is registered (registration of a new detection moving object) instead.

In the present embodiment, first, a Euclidean distance between the new detection moving object and an own vehicle is compared with a Euclidean distance between the moving object being tracked registered in the table and the own vehicle. Then, when a moving object having the greatest Euclidean distance is the moving object being tracked registered in the table, a moving object being tracked farthest from the own vehicle is determined as having the lowest possibility of collision, and deleted as a moving object being tracked that is considered most unnecessary. Thereafter, the new detection moving object is registered by the same processing as that in S205.

When the farthest object is a new detection moving object, the flow ends without registering this moving object. Here, the condition for deletion from the table is not limited to the magnitude of a Euclidean distance, and a condition other than a Euclidean distance, for example the state (such as being-interpolated) of a moving object being tracked may be applied.

In S207, whether to perform interpolation processing on a Kalman filter that is not associated with of an observation value is determined. The determination is performed by an interpolation count. In the present embodiment, the flow shifts to S208 when an interpolation count is, for example, three or more, whereas the flow shifts to S209 when an interpolation count is less than three.

In S208, due to the fact that an interpolation count has exceeded a threshold, the tracking target is determined as having been lost track of for such a reason that the tracking target moves out of a capture range, and the state of a relevant Kalman filter in the table is changed from being-interpolated to an invalid value so that the tracking target is not targeted for tracking.

In S209, processing of setting the predictive value of the object being tracked predicted in S103 to an updated value is performed. In this instance, the interpolation count is added by one.

Equation (16)

$$x^+ = x^- \qquad (16)$$

Equation (17)

$$P^+ = P^- \qquad (17)$$

Equation (18)

$$Intp = Intp + 1 \qquad (18)$$

In S210, processing is determined by the state of a Kalman filter. When the state is being-tracked, the flow shifts to S211-a, whereas the flow shifts to S211-b in relation to tracking-start, a tracking candidate, and being-interpolated. In S211-a and S211-b, the internal state is updated based on an observation value associated with a Kalman filter. First, a Kalman gain K is calculated by utilizing an observation error R', and global coordinates z of an advance error covariance matrix P$^-$, an observation matrix H, and an observation value. Here, I represents a unit matrix.

Equation (19)

$$H = \begin{pmatrix} 1 & 0 & 0 & 0 \\ 0 & 1 & 0 & 0 \end{pmatrix} \qquad (19)$$

Equation (20)

$$K = P_t^- * H^t * (H * P_t^- * H^t + R)^{-1} \qquad (20)$$

Equation (21)

$$x_t^+ = x_t^- + K(z - H * x_t^-) \qquad (21)$$

Equation (21)

$$P_t^+ = (I - K * H) * P_t^- \qquad (22)$$

In S211-a, the processing ends. In S211-b, the flow shifts to S212. A tracking-start state is updated to a tracking candidate state when the processing so far has been implemented, the value in the table is updated to a being-tracked state when a state is a being-interpolated state and the initial velocity is already calculated, and the value in the table is updated to a tracking candidate state when the initial velocity is not calculated.

In S212, whether to calculate a velocity for which 0 is substituted at the start of the tracking of a Kalman filter is determined. In the present embodiment, the calculation condition of an initial velocity is that the Kalman filter is updated three or more times, and that a certain movement or more has been made from a tracking start position.

Here, a threshold of a certain movement or more is determined based on a region determination result of an observation value implemented in S102. In the present embodiment, it is assumed that the distance is 1.5 m in the case of detection in the region A2, and the distance is 1.0 [m] in the case of detection in the region A3. An equation for estimating an initial velocity is shown below.

In the equation, n is a count of tracking, $x_{world}$, $y_{world}$ are global coordinate values of an observation value associated during tracking, and framerate is a frame rate calculated from a capture cycle. In the present embodiment, the frame rate is 30 fps.

Equation (23)

$$vx = \frac{\sum_{i=1}^{n}(x_{world_i} - x_{world_{i-1}})}{n * framerate} \quad (23)$$

Equation (24)

$$vy = \frac{\sum_{i=1}^{n}(y_{world_i} - y_{world_{i-1}})}{n * framerate} \quad (24)$$

The value calculated here is substituted for vx, vy of $x^+$ to produce an initial velocity. After the calculation of the initial velocity, a Kalman filter in a tracking candidate state is changed into a tracking state. A series of processing in S108 is performed for all Kalman filters and new detection moving objects.

In S109, the position of the moving object being tracked is output to the external system 40. In the present embodiment, a maximum of three moving objects being tracked are output. Among moving objects being tracked, being a tracking candidate, and being interpolated, moving objects are output as having a high possibility of collision, in ascending order of Euclidean distances between an own vehicle and a tracking target. A moving object in a tracking-start state has a possibility of instantaneous erroneous sensing, and is therefore not output.

While the embodiment according to the present disclosure has been described above, the present disclosure is not limited to the embodiment described above. For example, the embodiment described above is the detailed description of the present disclosure, and not all the components described need to be included. Moreover, it is also possible to add components in other embodiments to the components. In addition, it is possible to add, delete, or replace some of the components.

What is claimed is:

1. An external recognition device configured to detect and track a moving object around a mobile body equipped with a camera, the external recognition device comprising:
    a processor coupled to a memory, wherein the processor implements:
    an object position detection unit that detects a position of the moving object based on an image captured by the camera and represents the position of the moving object as an observation value;
    a region determination unit that determines a region in the image to which the moving object belongs based on the observation value detected by the object position detection unit, the image being separated into a plurality of regions in a vertical direction and the region determination unit determines the region in the image using the image separated into the plurality of regions;
    an observation error setting unit that calculates an error associated with the observation value based on the region in the image to which the moving object belongs, a different error being calculated for respective regions of the plurality of regions;
    a state prediction unit that predicts a state of the moving object at a current time, based on the observation value up to a previous time that is a time earlier than the current time and the error calculated by the observation error setting unit;
    an association unit that associates the state of the moving object at the current time predicted by the state prediction unit with the observation value detected by the object position detection unit; and
    a state update unit that updates the state of the moving object, based on a result of the association by the association unit,
    wherein when the observation value in the image detected by the object position detection unit is associated with a region in which the moving object cannot be correctly detected among the plurality of regions, the moving object is detected by an optical flow or a median flow, and
    wherein the observation value in the image detected by the object position detection unit is associated with a region having a high possibility of not including the entirety of the moving object among the plurality of regions, and at a time of the detection of the moving object by the alternative, detection is performed inside a region of the image calculated in accordance with a predictive value of the state prediction unit.

2. The external recognition device according to claim 1, wherein the region determination unit is configured to determine, by use of the image divided in a plurality of regions, which of the plurality of regions the observation value in the image detected by the object position detection unit belongs to, based on physical parameters that are a mounting position and a mounting orientation of the camera with respect to the mobile body, and lens distortion.

3. The external recognition device according to claim 1, wherein the region determination unit separates the plurality of regions into a region in which a relatively great error occurs due to a deviation of the observation value and a region in which a relatively small error occurs due to the deviation of the observation value in the vertical direction in the image.

4. The external recognition device according to claim 1, wherein the observation error setting unit is configured to
    add an error of the observation value in the image detected by the object position detection unit to the observation value in the image in each of upward, downward, rightward, and leftward directions of the image,
    project the observation value in the image to which the error is added on a mobile body coordinate system by use of a pinhole camera model, and
    thereafter, set, as an observation error, an average of absolute values of differences in each direction relative to a position where the observation value in the image is projected on a mobile body coordinate system.

5. The external recognition device according to claim 1, wherein the association unit is configured to
    associate, by use of a Mahalanobis distance, the state of the moving object at the current time predicted by the state prediction unit with the observation value detected by the object position detection unit, and
    verify, by a chi-squared test, a result of the association by the association unit.

6. The external recognition device according to claim 1, wherein the state prediction unit is configured to predict the observation value by use of movement information of the mobile body, not on coordinates of the image but on a coordinate system in which a spot at system startup is an origin, and
    the state update unit is configured to update the observation value on the coordinate system predicted by the state prediction unit, and tracks a target moving object.

7. The external recognition device according to claim 1, wherein in a state estimator including the state prediction unit and the state update unit, when a target of tracking has an internal state including a velocity, the state update unit is configured to calculate a movement velocity of the target of tracking, based on an observation value associated with each state estimator.

8. The external recognition device according to claim 1, wherein when the observation value is not obtained by a state estimator including the state prediction unit and the state update unit, an internal state and an error covariance matrix are updated by the state update unit, by use of a prediction result of the state prediction unit.

9. The external recognition device according to claim 3, wherein when the observation value in the image detected by the object position detection unit is a region above the region in which the relatively great error occurs due to the deviation of the observation value, and the observation value in the image detected by the object position detection unit is associated with a region higher than a vanishing point of the image among the plurality of regions, the position of the moving object is deleted.

10. A method, performed by an external recognition device, for detecting and tracking a moving object around a mobile body equipped with a camera, the method comprising:

detecting a position of the moving object based on an image captured by the camera and representing the position of the moving object as an observation value;

determining a region in the image to which the moving object belongs based on the observation value detected, the image being separated into a plurality of regions in a vertical direction;

calculating an error associated with the observation value based on the region in the image to which the moving object belongs, a different error being calculated for respective regions of the plurality of regions;

predicting a state of the moving object at a current time, based on the observation value up to a previous time earlier than the current time and the error calculated;

associating the state of the moving object at the current time predicted with the observation value detected; and updating the state of the moving object based on a result of the associating, wherein when the observation value in the image is associated with a region in which the moving object cannot be correctly detected among the plurality of regions, the moving object is detected by an optical flow or a median flow, and wherein the observation value in the image is associated with a region having a high possibility of not including the entirety of the moving object among the plurality of regions, and at a time of the detection of the moving object by the alternative, detection is performed inside a region of the image calculated in accordance with a predictive value of the state prediction unit.

\* \* \* \* \*